(12) United States Patent
Hosotani (10) Patent No.: US 6,320,763 B2
(45) Date of Patent: Nov. 20, 2001

(54) SWITCHING POWER SUPPLY UNIT (75) Inventor: Tatsuya Hosotani, Muko (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/753,593

(22) Filed: Jan. 3, 2001

(30) Foreign Application Priority Data

Jan. 11, 2000 (JP) ................................................. 12-002364

(51) Int. Cl.[7] ................................................. H02M 3/335
(52) U.S. Cl. ................................................. 363/16
(58) Field of Search ........................... 363/16, 20, 21.01, 363/21.04, 24–26, 56.01, 56.06, 97, 131, 133

(56) References Cited

U.S. PATENT DOCUMENTS

| | | | |
|---|---|---|---|
| 5,325,283 | * 6/1994 | Farrington et al. | 363/21 |
| 5,570,278 | * 10/1996 | Cross | 363/20 |
| 6,130,824 | * 10/2000 | Hosotani | 363/16 |
| 6,169,668 | * 1/2001 | Clayton | 363/26 |

FOREIGN PATENT DOCUMENTS 1187664    11/1999    (JP) .

\* cited by examiner

Primary Examiner—Matthew Nguyen
(74) Attorney, Agent, or Firm—Ostrolenk, Faber, Gerb & Soffen, LLP (57) ABSTRACT A switching power supply unit comprising: a transformer having a primary winding and a secondary winding, a capacitor coupled to the transformer, a first switching circuit connected in series with a series circuit of the primary winding and an input power source, the first switching circuit comprising a parallel circuit comprising a first switching element, a first diode and a first capacitor, a second switching circuit connected in parallel with the primary winding, the second switching circuit comprising a parallel circuit comprising a second switching element, a second diode and a second capacitor, first and second switching controlling circuits connected to the first and second switching circuits, respectively for controlling the first and second switching elements so as to turn on/off alternately with a period in which the first and second switching elements turn off being interposed therebetween, a rectifying and smoothing circuit connected to the secondary winding; and voltage detection and voltage reduction circuit having a control signal input terminal and connected to the rectifying and smoothing circuit, the voltage detection and voltage reduction circuit detecting an output voltage of the rectifying and smoothing circuit and outputting a feedback signal to the first switching controlling circuit such that an output voltage of the rectifying and smoothing circuit is stabilized at one of a first voltage and a second voltage lower than the first voltage based on a signal applied to the control signal input terminal.

30 Claims, 8 Drawing Sheets

(a) LIGHT LOAD
(b) RATED LOAD
(c) HEAVY LOAD

SWITCHING POWER SUPPLY UNIT

BACKGROUND OF THE INVENTION

1. Field of the Invention

The present invention relates to switching power supply units, and more specifically, the invention relates to switching power supply units which supply DC stabilized voltages.

2. Description of the Related Art

Figure 9:
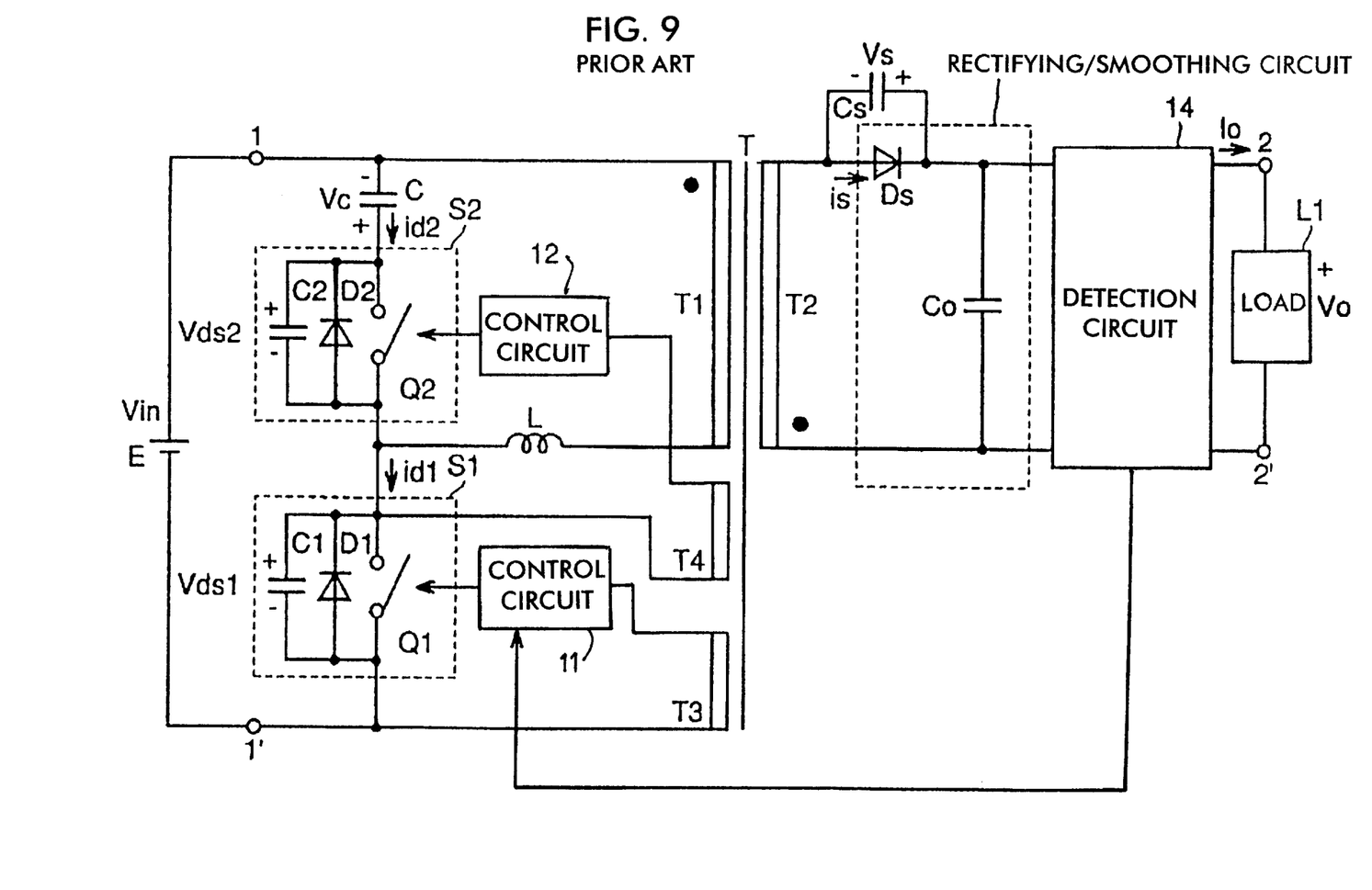
FIG. 9 shows a view illustrating an example of a conventional switching power supply unit.

FIG. 9 shows a view illustrating a switching power supply unit described in Japanese Unexamined Patent Application Publication No. 11-187664. First, referring to FIG. 9, a description will be given of the main structure of a conventional switching power supply unit. A first switching circuit S1 is formed by a parallel circuit composed of a switching element Q1, a diode D1, and a capacitor C1, and a second switching circuit S2 is formed by a parallel circuit composed of a switching element Q2, a diode D2, and a capacitor C2. The second switching circuit S2, the capacitor C, and an inductor L form a series resonance circuit. Control circuits 11 and 12 are disposed in such a manner that the first and second switching elements Q1 and Q2 are alternately switched on/off between periods during which both switching elements are turned off, and a rectifying element Ds is connected parallel to a capacitor Cs to place the period of a resonance produced by the capacitor Cs.

In the switching unit having such a structure, when the first switching element Q1 is switched off, a voltage is generated at a bias winding T4 as a driving winding of the second switching element, and the second switching element Q2 is thereby turned on. Then, a control transistor is switched on in a specified time determined by a time constant circuit inside the control circuit 12 so as to turn off the second switching element Q2. In this situation, if the rectifying diode Ds on the secondary side is in a conducting state, at a timing in which the diode Ds is brought into a non-conducting state, and if the diode Ds is in a non-conducting state, at a timing in which the second switching element Q2 is turned off, that is, at a timing in which the second switching element Q2 and the rectifying diode Ds are brought into a non-conducting state, a voltage is generated at a bias winding T3 as a driving winding of the first switching element Q1 to turn on the first switching element Q1.

In this way, the first switching element Q1 and the second switching element Q2 are alternately turned on/off between the periods in which both switching elements Q1 and S2 are turned off, and, energy stored in the primary winding T1 of the transformer T during a period in which the first switching element Q1 is turned on is output as electrical energy from the secondary winding T2 during a period in which the first switching element Q1 is turned off. The output energy is rectified by the rectifying element Ds, and is smoothed by a smoothing capacitor Co. Then, a DC voltage Vo is applied to a load L1 via a detection circuit 14.

In the switching power supply unit having such a structure, a part of energy once stored in the primary winding or the inductor L during a period in which the first switching element Q1 is turned on is stored in a resonance capacitor C on the primary side when the first switching element Q1 is turned off, and then, the energy is fed back to an input voltage during a period in which the second switching element Q2 is turned on. As a result, since a circulation current circulating in the circuit exists, a ratio of the circulation current with respect to an excitation current for supplying an output current increases more as the load becomes lighter, and under no load, only the circulation current exists. When the circulation current increases, conduction losses of the transformer T, and the first and second switching elements Q1 and Q2 increase, and the efficiency of the switching power supply thereby decreases.

SUMMARY OF THE INVENTION

Accordingly, it is an object of the present invention to provide a switching power supply unit in which such a feedback current is decreased, and, under light load and under no load, conduction losses of the transformer and the first and second switching elements are significantly reduced so that high efficiency of the switching power supply unit can be obtained and reduction of size and weight thereof can be achieved.

The switching power supply unit according to the present invention comprises: a transformer having a primary winding and a secondary winding; a capacitor; a first switching circuit connected in series with a series circuit of the primary winding and an input power, the first switching circuit comprising a parallel circuit of a first switching element, a first diode and a first capacitor; a second switching circuit connected in parallel with the primary winding, the second switching circuit comprising a parallel circuit of a second switching element, a second diode and a second capacitor; first and second switching controlling circuits connected to the first and second switching circuits, respectively for controlling the first and second switching elements so as to turn on/off alternately with interposing of a period in which the first and second switching elements turn off, a rectifying and smoothing circuit connected to the secondary winding; and a voltage detection and voltage reduction circuit having a control signal input terminal and connected to the rectifying and smoothing circuit, the voltage detection and voltage reduction circuit detecting an output voltage of the rectifying and smoothing circuit and outputting a feedback signal to the first switching controlling circuit such that an output voltage of the rectifying and smoothing circuit is stabilized at either a first voltage or a second voltage lower than the first voltage based on a signal applied to the control signal input terminal.

According to the present invention, by decreasing an output voltage at no load or at light load, the inclination of a reset current determined by the inductor of the secondary winding of the transformer and the output voltage is reduced and a feedback current can thereby be reduced. With this arrangement, conduction losses of the transformer and the switching elements can be greatly reduced, with the result that high efficiency, miniaturization, and weight reduction can be achieved.

In addition, since an operational mode can be changed by decreasing the output voltage on the secondary-side circuit, it is not necessary to control the switching elements by transmitting a control signal to the primary-side control circuit from the secondary side, as performed in conventional cases. Thus, reduction of size, weight, and cost by reducing the number of components can also be achieved.

It is preferable that at least one of the first and second switching elements is formed by a field-effect transistor. In the case, since the parasitic diode and parasitic capacitance of a field-effect transistor can be used as the diode and the capacitor forming the switching circuit, reduction of size, weight, and cost can be achieved by reducing the number of components.

The transformer may include a first driving winding for generating a voltage bringing the first switching element into conduction and a second driving winding for generating a voltage driving the second switching element to perform a self-excited oscillation.

In this case, since the self-excited oscillation of the switching circuit is performed by a voltage generated from each of the primary and secondary driving windings of the transformer, it is thereby unnecessary to dispose any oscillation circuit comprising an IC or the like. As a result, reduction of size, weight, and cost can be achieved by reducing the number of components.

The transformer may include a leakage inductor disposed between the primary winding and the secondary winding or an inductor connected in series to the transformer; and the inductor and the capacitor form a resonance circuit.

In this case, a resonance circuit is formed by both the inductor disposed between the primary and secondary windings of the transformer or the leakage inductor connected in series to the transformer and the capacitor connected in series to the second switching circuit. With this arrangement, the peak current value of the current waveform on the secondary side is reduced, and an effective current is thereby reduced so as to decrease the conduction loss of the secondary-side diode. In addition, a reverse recovery loss can be decreased by performing a zero-current turning-off of the secondary-side diode. Furthermore, the switching loss can be reduced by performing a zero-current turning-off of the second switching element, with the result that high efficiency can be obtained and reduction of size and weight can be achieved.

The rectifying/smoothing circuit may include a diode, and a parasitic capacitance of the diode or a capacitive impedance connected in parallel to the diode; and the parasitic capacitance or the capacitive impedance and the inductor of the transformer form a resonance circuit during a period in which the first and second switching elements are both turned off.

In this case, the parasitic capacitance of the diode of the rectifying/smoothing circuit or the capacitive impedance connected in parallel to the diode and the inductor of the transformer form a resonance circuit during a period in which both the first and second switching elements are turned off. With this arrangement, electrical charge stored in the parasitic capacitance of the diode or the capacitive impedance connected in parallel to the diode when the secondary-side diode is brought into a non-conductive state, can be transmitted as electrical energy to the secondary side when the secondary-side diode is brought into a conductive state. Since the electrical energy is transmitted to the secondary side without the conduction of the secondary-side diode, there is no voltage drop in the secondary-side diode, thereby leading to loss reduction. In addition, since the peak current value is reduced by making the secondary-side current waveform closer to a squareshaped waveform, the effective current can be reduced and the conduction loss of the secondary-side diode can thereby be decreased.

In addition, in the case of the structure of a self-excited system, when the second switching element is turned OFF and the secondary-side diode is brought into a non-conductive state, an output voltage smoothed on the secondary side or a fly-back voltage of the primary-side capacitor is used as a voltage source, and the parasitic capacitance of the diode or the capacitive impedance connected in parallel to the diode resonates with the inductor of the transformer. This permits a voltage to be generated at the driving winding of the first switching element so that the first switching element is turned on and a self-excited oscillation can be performed.

The control circuit controlling the second switching element may include a time constant control circuit comprised of a transistor, a capacitor, and an impedance circuit.

In this case, since the control circuit controlling the second switching element includes the time constant control circuit comprising the transistor, the capacitor, and the impedance circuit, it is not necessary to dispose a component such as an isolation transformer for driving the control circuit controlling the second switching element. Thus, since it is possible to reduce the number of components used to form a circuit in which the first and second switching elements are alternately switched on/off between the periods in which both switching elements are in off-states, reduction of size, weight, and cost of the unit can be achieved due to reduction of the number of components.

The on-period of the first switching element may be controlled so as to control the output voltage so that the on-period of the second switching element is maintained approximately constant.

In this case, an output voltage is controlled by controlling the on-time of the first switching element to maintain the on-time of the second switching element approximately constant. With this arrangement, for example, by approximately coinciding the reset time of excitation energy stored in the transformer under rated load with the on-time of the second switching element, the value of the feedback current can be minimized. Under load lighter than the rated load, since an arrangement can be made such that the output voltage is decreased so as to reduce the feedback current, the control system can be simplified.

The switching power supply unit may further comprise a control circuit for controlling the time of conduction of the second switching element such that at least one of the first and second switching elements is brought into a conductive state at a voltage of zero or after dropping down to the voltage of zero.

In this case, the time of conduction of the second switching element is controlled such that at least one of the first and second switching elements is brought into a conductive state at a voltage of zero or after dropping down to the voltage of zero. With this arrangement, since a zero-voltage switching operation and a low-voltage switching operation can be performed, switching loss can be reduced, and a high-frequency compact and lightweight power supply unit having high efficiency can be obtained.

The output voltage may be decreased by the voltage detection and voltage reduction circuit to reduce the current fed back to the input power supply; and the operations of the first and second switching elements are intermittent oscillation operations in which an oscillation period for performing the on/off switching operations and a suspension period for performing no switching operations are alternately repeated.

In this case, when an intermittent oscillation operation is performed, switching operation is not performed during a suspension period, and no switching loss thereby occurs. Furthermore, since a circulation current can be decreased even in the switching period, conduction loss can be reduced. As a result, since loss per unit of time can be significantly decreased and power conversion efficiency is thereby greatly enhanced, a compact and lightweight power supply unit with high efficiency can thereby be produced.

The switching power supply may further comprise an output stabilization circuit connected to the secondary winding of the transformer.

In this case, since an output stabilization circuit connected to the secondary winding of the transformer is provided, even if the output voltage is decreased, the output voltage of the rear stage of the voltage stabilization circuit can be stabilized so as to be maintained constant, with the result that the output stabilization circuit can be used as a power source for a logic circuit requiring a constantly stable fixed voltage. In addition, since the voltage stabilization circuit is formed by a voltage-dropping type stabilization circuit, the potential difference between the input and output of the stabilization circuit can be decreased by reduction of the output voltage, and it is thereby possible to obtain a secondary advantage that the conversion efficiency of the voltage stabilization circuit can be enhanced.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWING(S)

FIGS. 2a–(f) show operational waveforms of parts of the switching power supply unit shown in FIG. 1.

FIGS. 7(a)–(d) show waveform views for illustrating intermittent oscillation operations.

DETAILED DESCRIPTION OF EMBODIMENTS OF THE INVENTION

Hereinafter, the preferred embodiments of the present invention are explained in detail with reference to the drawings.

Figure 1:
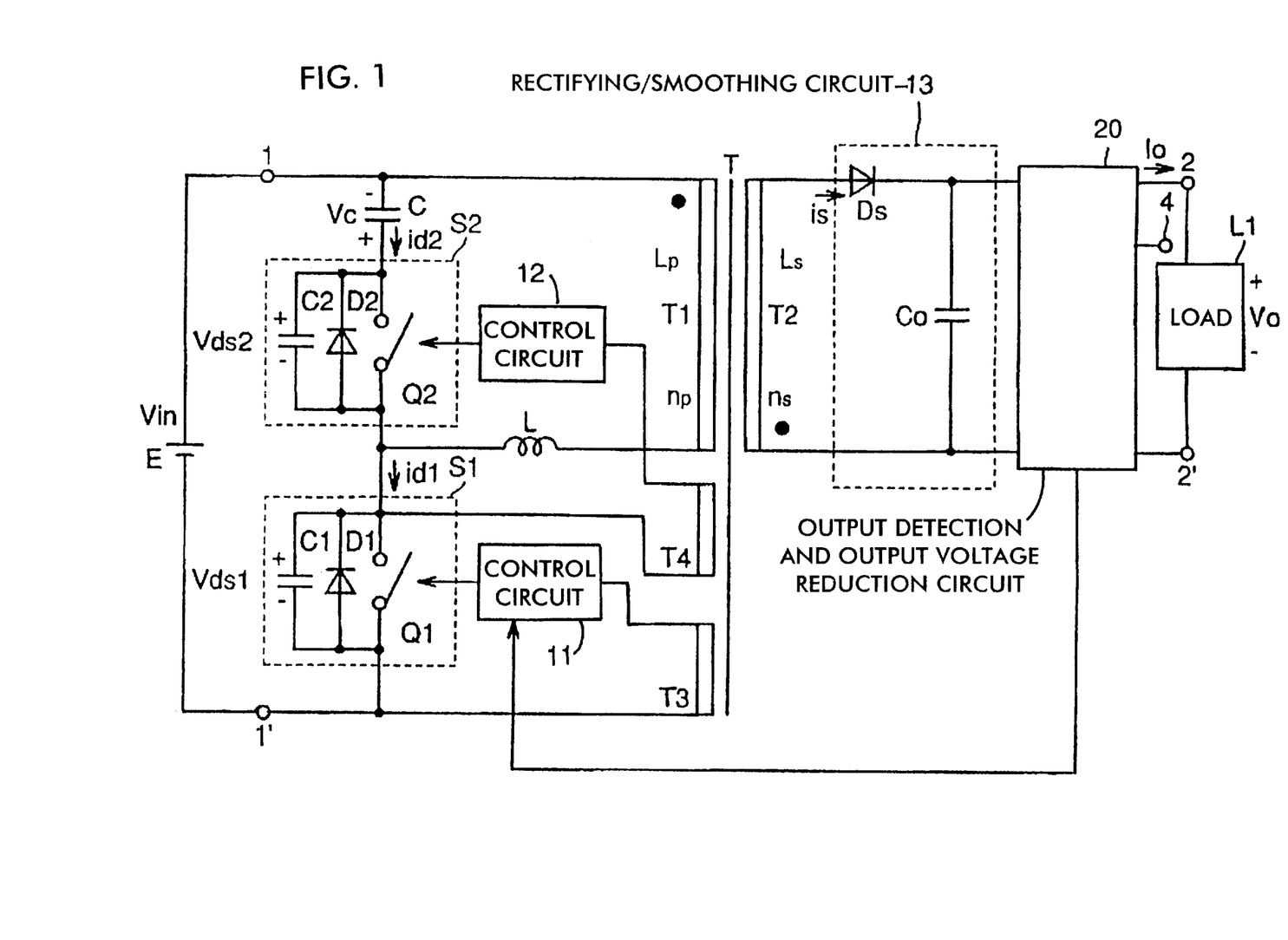
FIG. 1 shows a view illustrating a switching power supply unit according to an embodiment of the present invention.

FIG. 1 is a view illustrating a switching power supply unit according to an embodiment of the present invention. In FIG. 1, a transformer T includes a primary winding T1, a secondary winding T2, a bias winding T3 as a first driving winding, and a bias winding T4 as a second driving winding. A series circuit composed of the primary winding T1 and an inductor L is connected in series to a first switching circuit S1 and an input power supply E.

A series circuit composed of a second switching circuit S2 and a capacitor C is connected in parallel to the series circuit composed of the primary winding T1 of the transformer T and the inductor L. At the secondary winding T2 of the transformer T, a rectifying/smoothing circuit 13 composed of a rectifying diode Ds and a smoothing capacitor Co is disposed.

The first switching circuit S1 is formed by a parallel connection circuit composed of a first switching element Q1, a first diode D1, and a first capacitor C1. The second switching circuit S2 is formed by a parallel connection circuit composed of a second switching element Q2, a second diode D2, and a second capacitor C2. The bias windings T3 and T4 of the transformer T are connected so as to control circuits 11 and 12 controlling the first and second switching elements Q1 and Q2.

The output side of the rectifying/smoothing circuit 13 is connected to an output-detection and output-voltage-reduction circuit 20. The output-detection and output-voltage-reduction circuit 20 detects an output voltage Vo supplied to a load L1, and detects an output current Io, if necessary. The detected signal is provided to the control circuit 11 to control the on-time of the switching element Q1.

The output-detection and output-voltage-reduction circuit 20 has a control signal input terminal 4. Based on the signal applied to the control signal input terminal, the output-detection and output-voltage-reduction circuit 20 outputs a feedback signal to the control circuit 11 such that an output voltage of the rectifying and smoothing circuit is stabilized at either a first voltage or a second voltage lower than the first voltage.

The control circuit 11 shown in FIG. 1, according to a voltage generated at the bias winding T3, permits the switching element Q1 to perform a self-excited oscillation by applying a positive feedback to the switching element Q1. The signal detected by the output-detection and output-voltage-reduction circuit 20 is, as generally required, input via an isolation circuit, and according to the difference between a voltage of the input signal and a reference voltage, the off-timing of the first switching element Q1 is controlled so as to control the on-time of the switching element Q1.

The control circuit 12 controls the on-time of the second switching element Q2 by controlling the off-timing of the switching element Q2 with the input of a voltage generated at the bias winding T4. The control circuit 12 controls the on-time of the second switching element Q2 with the input of the signal detected by the output-detection and output-voltage-reduction circuit 20 as needed. As will be explained later, it is preferable that the control circuit 12 controls the on-time of the second switching element Q2 so as to be substantially constant at the time when the output voltage of the rectifying and smoothing circuit should be stabilized at the first voltage and at the time when the output voltage of the rectifying and smoothing circuit should be stabilized at the second voltage.

The control circuits 11 and 12 control in such a manner that the switching elements Q1 and Q2 are alternately switched on/off with a period in which both switching elements Q1 and Q2 are turned off interposed there between. With this structure, for example, since it is unnecessary to use any switching controlling IC such as a separately-excited-oscillation-type fly-back converter, the control circuits 11 and 12 can be formed by simple circuits.

The inductor L represents a leakage inductor of the transformer T as a circuit element. However, in order to set a resonant frequency (cycle) of the capacitor C and the inductor L to a specified value, besides the transformer T, an inductor may be connected in series to the primary winding of the transformer.

FIG. 2(a)–(f) show waveforms of parts of the circuit shown in FIG. 1. Referring to FIGS. 1 and 2, a description will now be given of the operation of the circuit. Waveforms (a) and (b) show signals indicating the on/off state of the switching elements Q1 and Q2, and Waveforms (c) and (d) show a voltage waveform signal Vds1 across the capacitor C1 and a current waveform signal id1 of the switching circuit S1, respectively. Waveforms (e) and (f) show a voltage waveform signal Vds2 across the capacitor C2 and a current waveform signal id2 of the switching circuit S2, respectively.

The operation of the switching power supply unit shown in FIG. 1 can be divided into five operational states by times t1 to t6 during one switching cycle Ts. The operation in each state will be illustrated below.

<State 1>t1 to t2

The switching element Q1 is turned on as shown by the wave form (a). An input voltage is applied to the primary winding T1 of the transformer T, and a current of the primary winding of the transformer T linearly increases so that excitation energy is stored in the transformer T. When the switching element Q1 is switched off at Time t2, the operation of the switching power supply unit goes into State 2.

<State 2>t2 to t3

When the switching element Q1 is turned off, the primary winding T1 of the transformer T and the inductor L resonate with the capacitors C1 and C2, and the capacitor C1 is charged and the capacitor C2 is discharged. As shown by the waveform (c), a curve of the rising part of the voltage waveform signal Vds1 of the capacitor C1 is a part of a sine wave generated by resonance produced by the capacitor C1, the inductor L, and the inductor of the primary winding T1. The rising part of the current waveform signal id1 of the switching circuit S1 shown by the waveform (d) is a waveform of 90° phase leading of the voltage waveform signal Vds1.

As shown by the waveform (e), when the voltage Vds2 of the capacitor C drops down to a voltage of zero, the diode D2 is brought into conduction, and the switching element Q2 shown by waveform (b) is turned on. With this arrangement, a zero-voltage switching operation is performed and the operation moves into State 3. As shown by the waveform (e), the curve of the falling part of the voltage Vds2 of the capacitor C2 is a part of a sine wave generated by resonance produced by the capacitor C2, the inductor L, and the inductor of the primary winding T1. As shown by the waveform (f), the falling part of the current waveform signal id2 is a waveform of 90° phase leading of the voltage waveform signal Vds2. In this situation, the rectifying element Ds is brought into conduction and a zero-voltage turning-on operation is thereby started.

<State 3>t3 to t4

In State 3, the diode D2 or the switching element Q2 is brought into conduction, and the inductor L and the capacitor C thereby begin to resonate with each other. Under the circumstances, on the secondary side, the rectifying element Ds is brought into conduction and the excitation energy stored in the transformer T is thereby discharged from the secondary winding T2 to be output via the rectifying/smoothing circuit 13. In this case, since a current is which flows through the rectifying element Ds is similar to a value obtained by deducting a linearly decreasing excitation current im from a resonance current id2 obtained by the inductor L and the capacitor C on the primary side, the current id2 rises from a voltage of zero to make a waveform having a sine-wave curve. As a result, the current is drops down to a zero current after reaching a peak at which a current changing rate is zero. At Time t4, the relationship between the excitation current im of the transformer and the current id2 is expressed by an equation im=id2. When the secondary-side current Is becomes 0, the rectifying element Ds is turned off, and the zero-current turning-off operation of the rectifying element Ds is thereby performed. Then, State 3 ends.

<State 4>t4 to t5

When the rectifying element Ds is turned off, the resonance between the capacitor C and the inductor L on the primary side ends, and only the excitation current im flows by discharging of the capacitor C to excite the transformer T in a direction opposite to that in State 1. The current id2 linearly rising from t4 to t5 is equivalent to the excitation current im.

<State 5>t5 to t6

When the switching element Q2 is turned off at t5, the primary winding T1 of the transformer T and the inductor L resonate with the capacitors C1 and C2 to discharge the capacitor C1 and charge the capacitor C2. When the voltage Vds1 of the capacitor C1 drops down to be a voltage of zero, the diode D1 is brought into conduction. In this case, the switching element Q1 is turned on at t6 to perform the zero-voltage switching operation, and then, State 5 ends and the cycle repeats.

The above-described operations are performed for a single switching cycle, and the same operations are performed for the next switching cycle. After this, the operations are repeated. In the switching power supply circuit described above, since the switching elements Q1 and Q2 are turned on at a voltage of zero and the switching element Q2 is turned off near zero current, switching loss is greatly reduced. In addition, the secondary-side rectifying element Ds is turned on at zero current, and the current waveform thereof relatively steeply rises up from the zero current. After reaching the peak at which the current changing rate is zero, the current waveform again turns to be that of a zero current so as to turn off the rectifying element Ds. As a result, the waveform of the current flowing through the rectifying element Ds makes a square waveform so that a peak current value is reduced to a low level, the effective current value is decreased, thereby leading to the reduction of conduction loss.

Figure 3:
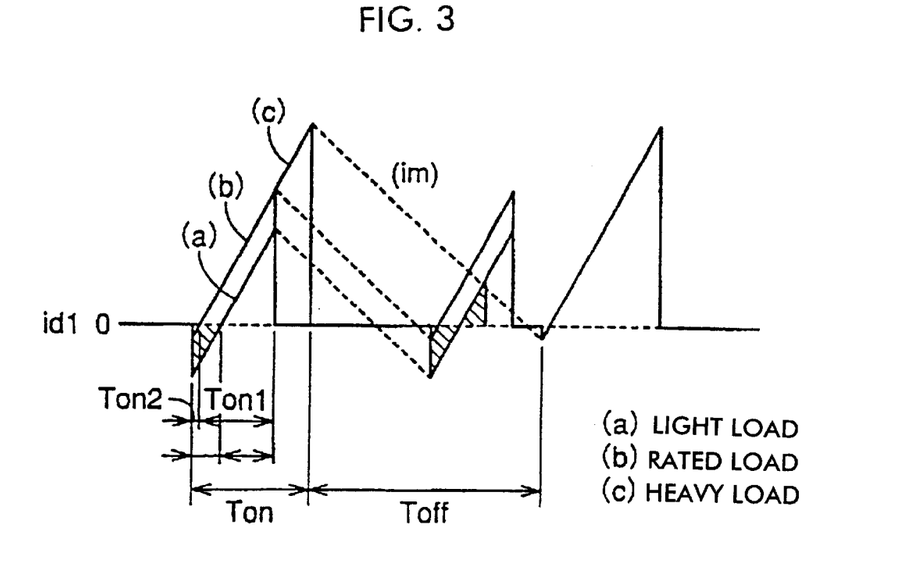
FIG. 3 shows the illustration of examples of changes in a current idI with respect to the magnitudes of loads.
Figure 4:
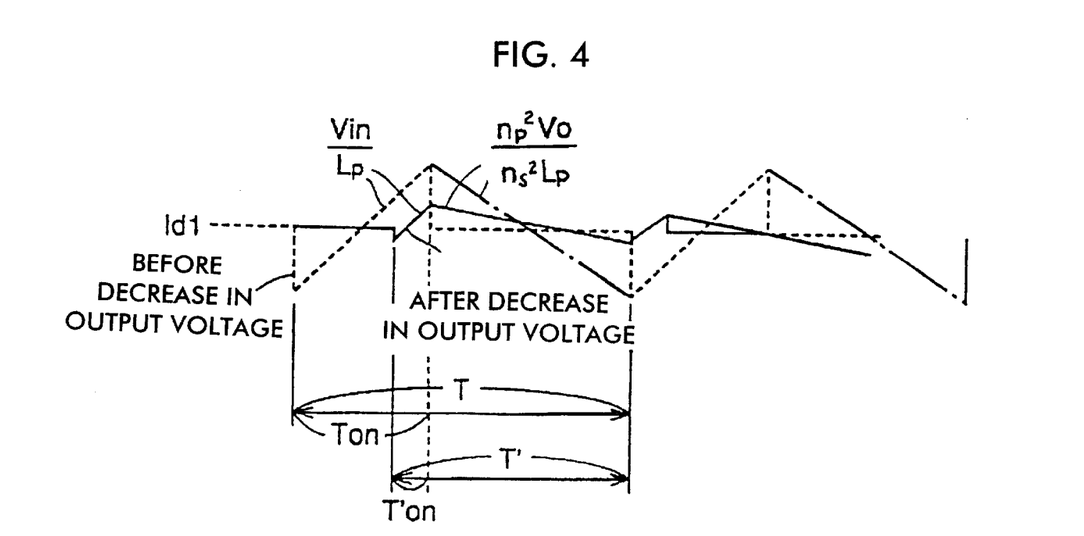
FIG. 4 shows current waveforms obtained before and after an output voltage decreases.

FIG. 3 shows an example of changes in the current id1 with respect to the magnitudes of loads, and FIG. 4 shows current waveforms obtained before and after a decrease in an output voltage.

Figure 2:
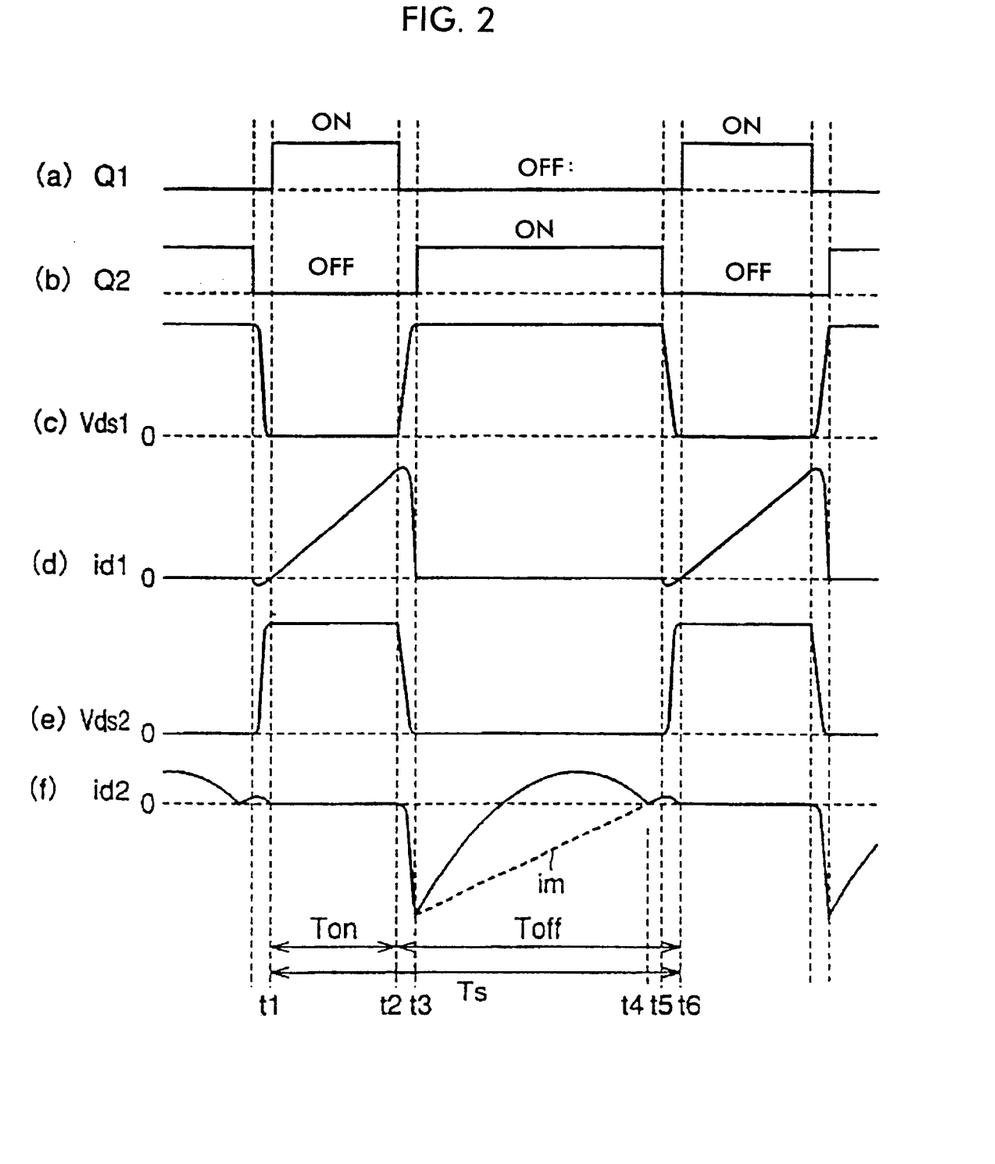

Now, a more detailed explanation will be given of the circulation current described in the conventional example. In the conventional case, FIG. 3 shows changes in the peak of a current occurring by controlling the periods in which the first switching circuit S1 is turned on/off. In this situation, waveform (a) is a change at light load, waveform (b) is a change at rated load, and waveform (c) is a change at heavy load. In FIG. 3, regarding the excitation current im indicated by a dotted line, the positive side of the current is in a direction opposite to that shown in FIG. 2.

As shown in FIG. 3, when the change at light load represented by the waveform (a) is compared with that at rated load by the waveform (b), the lighter the load, the greater the ratio of the on-time Ton 2 with respect to Ton 1. In other words, the control circuit 12 turns the switching element Q2 on/off alternately with respect to the switching element Q1, and controls so as to maintain Ton+Toff constant by maintaining the on-time Toff of the switching element Q2 constant, regardless of the magnitude of the load. In FIG. 3, the shaded portion shows a circulation current not relating to an output to be a feedback current. As illustrated in the conventional example, when the ratio of the circulation current increases, conductive efficiencies of the transformer T and the switching elements Q1 and Q2 increase, whereby the efficiency decreases.

Thus, in the embodiment of the present invention, the output-detection and output-voltage-reduction circuit 20 shown in FIG. 1 is provided to reduce the circulation current. That is, the dotted line shown in FIG. 4 indicates the current id1 flowing through the switching circuit S1 obtained before the output voltage decreases. The current id1 drops down to the negative side, and then, increases with a constant inclination. The inclination is represented by Vin/Lp (Vin: a power supply voltage, and Lp: the inductance of the primary winding of the transformer T).

When the switching element Q2 is turned off, after turning off, the current id1 decreases. The inclination of the decreasing current is expressed by $n_p^2 Vo/(n_s^2 L_p)$ ($n_p$: a ratio of the number of turns of the primary winding of the transformer T, Vo: an output voltage, and $n_s$: the number of secondary windings). In this case, since the winding numbers $n_p$ and $n_s$ and the inductance $L_p$ of the primary winding T1 have constant values, when the output voltage Vo is set at a low level by the output-detection and output-voltage-reduction circuit 20, the inclination has a gentle slope so that the feedback current and the circulation current can be greatly reduced, and the conduction loss can be reduced so as to obtain high efficiency. Regarding a detailed example of the output-detection and output-voltage-reduction circuit 20, a detailed description will be given in FIG. 6, which will be described below.

Figure 5:
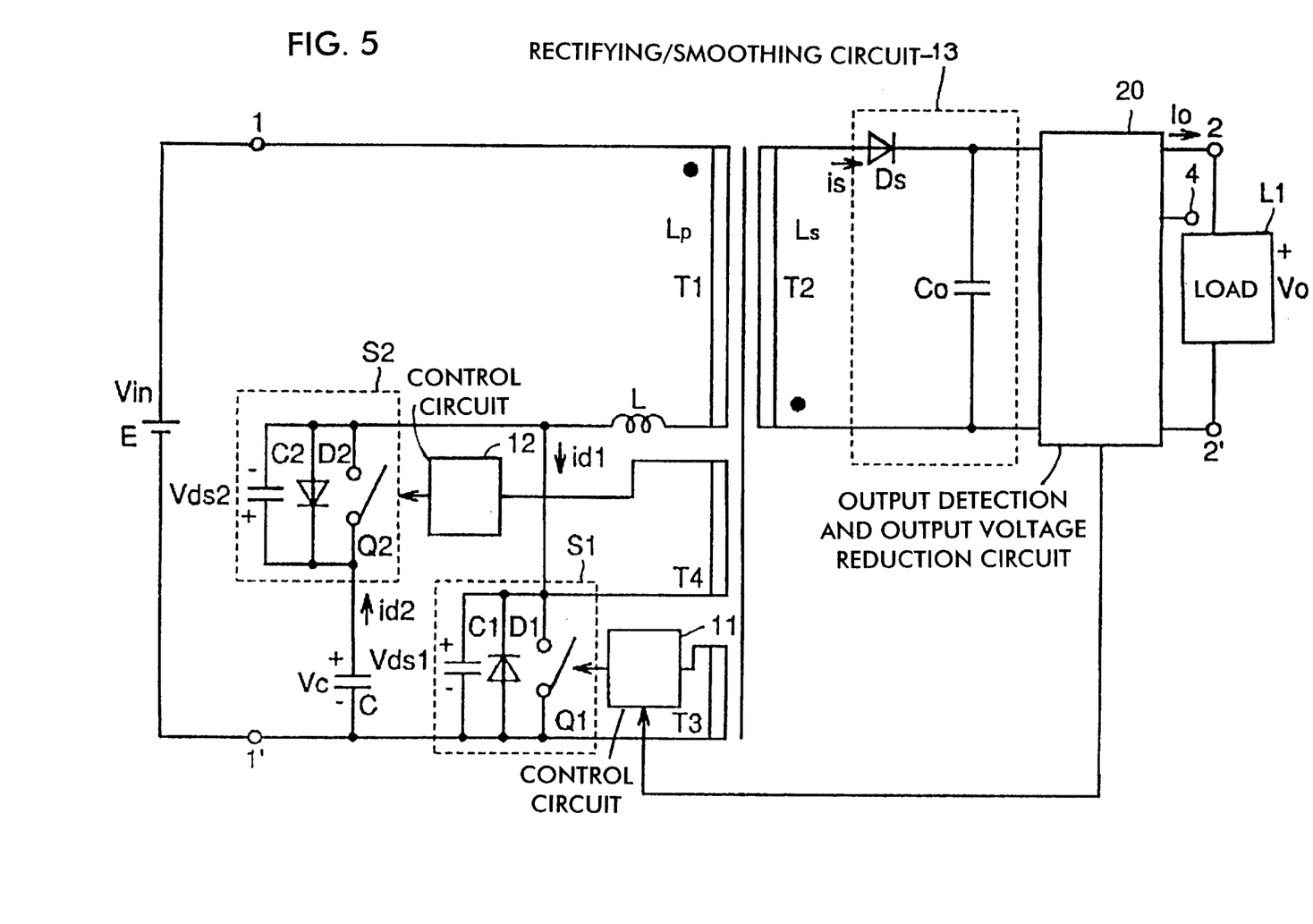
FIG. 5 shows a switching power supply unit according to another embodiment of the present invention.

FIG. 5 is a view illustrating a switching power supply unit according to another embodiment of the present invention. In the embodiment shown in FIG. 5, a series circuit composed of a switching circuit S2 and a capacitor C is connected parallel to a switching circuit S1, and the operational advantages of the circuit is the same as those shown in FIG. 1.

Figure 6:
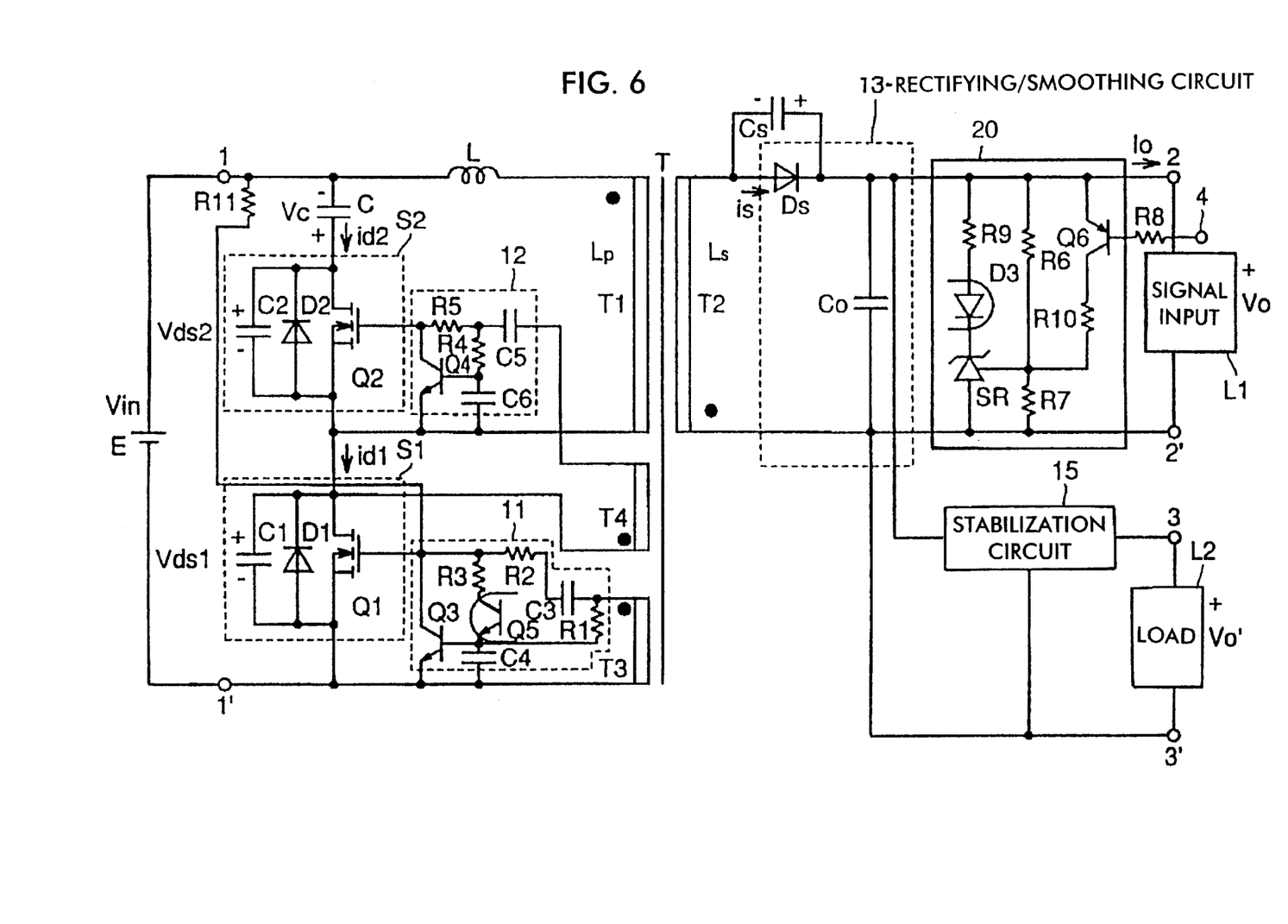
FIG. 6 shows a more detailed electric circuit diagram of a switching power supply unit according to another embodiment of the present invention.

FIG. 6 is a view illustrating a switching power supply unit according to another embodiment of the present invention.

In the embodiment shown in FIG. 6, the parts different from those of the embodiment shown in FIG. 1 are as follows. That is, an inductor L is connected in series between the + side of an input power supply E and an end of a primary winding T1 of a transformer T, and the input power supply E, the inductor L, the primary winding Ti, and the switching circuit S1 are connected in series. MOS-FETs are used as a switching element Q1 of the switching circuit S1 and a switching element Q2 of the switching circuit S2.

A control circuit 11 is constituted of a transistor Q3, a phototransistor Q5 of a photo coupler as an isolation circuit, resistors R1, R2, and R3, and capacitors C3 and C4. A voltage generated at a bias winding 3 is applied to the gate of a MOS-FET Q1 via the capacitor C3 and the resistor R2. A series circuit composed of the resistor R3 and the phototransistor Q5, and the capacitor C4, which are connected between an end of each of the resistors R1 and R2 and the gate of the MOS-FET Q1, form a time constant circuit.

A control circuit 12 is constituted of a transistor Q4, resistors R4 and R5, and capacitors C5 and C6. A voltage generated at a bias winding T4 is applied to the gate of a MOS-FET Q2 via the capacitor C5 and the resistor R5. The resistor R4 and the capacitor C6 form a time constant circuit. A resistor R11 is a starting resistor for applying a voltage at starting up.

An output-detection and output-voltage-reduction circuit 20 is constituted of a series circuit composed of a resistor R9, a photo diode D3 of a photo coupler, and a shunt regulator SR, a series circuit of resistors R6 and R7, which are connected between the outputs of a rectifying/smoothing circuit 13, a transistor Q6 and a resistor R10 connected between both ends of the resistor R6 to receive a signal from the outside via a resistor R8. The shunt regulator SR is, for example, formed by an operational amplifier, and permits a photo diode D3 to be lit when a comparative voltage divided by the resistors R6 and R7 exceeds a reference voltage of the operational amplifier. The transistor Q6 is turned on when a low level signal is input from the outside via a resistor R8, and with the parallel connection of the resistor R6 and the resistor R10, an output voltage is made lower. A capacitor Cs is connected parallel to the rectifying element Ds.

In addition, a stabilization circuit 15 is disposed parallel to the output-detection and output-voltage-reduction circuit 20. For example, even if a direct current of 24 V is output from the rectifying/smoothing circuit 13, and the voltage of 24 V is reduced by the operation of the output-detection and output-voltage-reduction circuit 20, the stabilization circuit 15 as another system outputs, for example, a stabilized voltage of 5 V used for a logic circuit to a load L2.

Next, a description will be given of the detailed operation of the switching power supply unit shown in FIG. 6. First, at starting up, a voltage is applied to the gate of the MOS-FET Q1 via the resistor R11, and the MOS-FET Q1 is thereby turned on. When the MOS-FET Q1 is turned on, a voltage is induced across both ends of the bias winding T3. In addition, in a normal operation after starting up, at a timing in which the MOS-FET Q2 and the diode are brought into non-conductive states, a voltage is generated at the bias winding T3. When the voltage is generated at both ends of the bias winding T3, the voltage is applied to the gate of the MOSFET Q1 via the capacitor C3 and the resistor R2 to turn on the MOS-FET Q1. In this situation, the capacitor C4 is gradually charged via the resistors R1 and R3, and the phototransistor Q5. When the charged voltage of the capacitor C4 exceeds a threshold voltage (for example, 0.6 V) of the transistor Q3 after a fixed duration in time, since the transistor Q3 is turned on so that the gate voltage of the MOS-FET Q1 becomes a ground potential, the MOS-FET Q1 is turned off. As a result, the potential of the primary winding T1 is reversed and energy is thereby supplied from the secondary winding T2.

Meanwhile, when a voltage is generated at the bias winding T4, the voltage is applied to the gate of the MOS-FET Q2 via the capacitor C5 and the resistor R5 of the control circuit 12 to turn on the MOS-FET Q2. In this situation, the capacitor C6 is charged via the capacitor C5 and the resistor R4. When the charged voltage of the capacitor C6 exceeds a threshold voltage of the transistor Q4 after a fixed duration in time, the transistor Q4 is turned on and the MOS-FET Q2 is thereby turned off. By repeating this operation, energy from the secondary winding T2 is supplied as a voltage Vo to a load L1 via the rectifying/smoothing circuit 13 and the output-detection and output-voltage-reduction circuit 20. In addition, a direct-current voltage rectified by the rectifying/smoothing circuit 13 is converted into a specified stabilized voltage by the stabilization circuit 15, and an output voltage Vo' is thereby supplied to the load L2.

In this embodiment, mainly under light load, control is provided such that the output voltage is decreased to reduce the circulation current and the feedback current. In other words, when a signal is input to a terminal 4 from the outside, the transistor Q6 is turned on, and with the parallel connection of the resistor R6 and the resistor R10, voltage across resistor R7 increases. The voltage is higher than a reference voltage of the shunt regulator SR, and a current thereby flows through a light-emitting diode D3 to emit light. As a result, the impedance of the phototransistor Q5 of the control circuit 11 decreases and the on-time of the MOS-FET Q1 is thereby shortened, by which the output voltage is decreased.

The capacitor Cs is connected across the rectifying element Ds. The capacitor Cs resonates with the secondary winding T2 of the transformer T when the MOS-FET Q1 or Q2 is turned off, and the voltage waveform of the capacitor CS forms a waveform of a part of a sine waveform. Then, the capacitance of the capacitor CS is set in such a manner that the voltage waveform rises up from a voltage of zero or drops down to the voltage of zero in a specified time. With this arrangement, since the voltage across capacitor Cs is not accompanied by steep changes, the switching loss and reverse recovery loss of the rectifying element Ds are reduced.

Next, as a modified example of the embodiment shown in FIG. 6, an example of intermittent oscillation operation will be illustrated. When an output voltage is reduced by the output-detection and output-voltage-reduction circuit 20, a power supply fed back to the input power supply E is reduced. As shown in FIG. 4, the switching cycle T is shortened to be the switching cycle T' and a switching frequency thereby increases. In this way, an arrangement is made in such a manner that an intermittent oscillation operation in which oscillation periods for performing the on/off switching operations of the MOS-FETs Q1 and Q2 and suspension periods for performing no switching operations are alternately repeated is performed, when the switching frequency exceeds the frequency of a certain threshold in this way. Since no switching operations are performed during the suspension periods in the intermittent oscillation operation, no switching loss occurs at all. In addition, even in the switching cycle, the circulation current decreases, and conduction loss thereby decreases. As a result, loss per unit of time is significantly reduced, and power conversion efficiency greatly increases.

FIGS. 7(a)–(d) show waveforms for illustrating such an intermittent oscillation operation. Next, referring to FIGS. 6 and 7, the intermittent oscillation operation will be explained. As described above, when the output voltage is made lower by an input signal, the circulation current decreases. Then, the on-time Ton of the MOSFET Q1 shown in FIG. 6 becomes Ton' to be shorter, and the switching frequency thereby increases.

As a detailed operation, when a voltage is generated at the bias winding T3, the voltage is applied to the gate of the MOS-FET Q1 via the capacitor C3 and the resistor R2 to turn on the MOS-FET Q1. In this case, a delay time in which after generation of the voltage at the bias winding T3, the voltage is applied to the gate of the MOS-FET Q1 and exceeds the threshold voltage so as to turn on the MOS-FET Q1 is set as t1. In addition, a delay time in which after generation of the voltage at the bias winding T3, the capacitor C4 is gradually charged via the series circuit composed of the resistors R1 and R3 and the phototransistor Q5, the voltage charged in the capacitor C4 exceeds the threshold voltage of the transistor Q3 to turn on the transistor Q3 and turn off the MOS-FET Q1 is set as t2. In this case, the time (t2–t1) is equivalent to a time in which the voltage is applied to the gate of the MOS-FET Q1. The delay time t1 is a constant value determined by the capacitance value of the capacitor C3, the resistance value of the resistor R2, and the voltage generated at the bias winding T3. The delay time t2 is determined by a time constant determined by the capacitance value of the capacitor C4, the resistance value of the resistor R3, and the impedance of the phototransistor Q5, the voltage generated at the gate of the MOS-FET Q1, and the like. The delay time t2 is a value changing according to an output, since the impedance of the phototransistor Q5 changes. In other words, when the output is large, the delay time t2 becomes longer, and when the output is smaller, the delay time t2 becomes shorter.

Now, when the MOS-FET Q1 is performing the switching operation, as the output voltage is gradually increasing, the delay time t2 is becoming shorter. In this situation, when the delay time t2 becomes shorter than the delay time t1 due to the delay of the control system or the like, the MOS-FET Q1 cannot be turned on. In a case in which the MOS-FET Q1 cannot be turned on by the voltage generated at the bias winding T3, the switching operation of the MOS-FET Q1 is suspended, and then, until the MOS-FET Q1 is turned on via the starting resistor, the suspension period continues. Furthermore, a period continuing until the turn-on of the MOS-FET Q1 becomes impossible after the MOS-FET Q1 is turned on via the starting resistor and the delay time t2 becomes shorter than the delay time t1 is equivalent to an oscillation period, by which an intermittent oscillation operation is performed.

Figure 7:
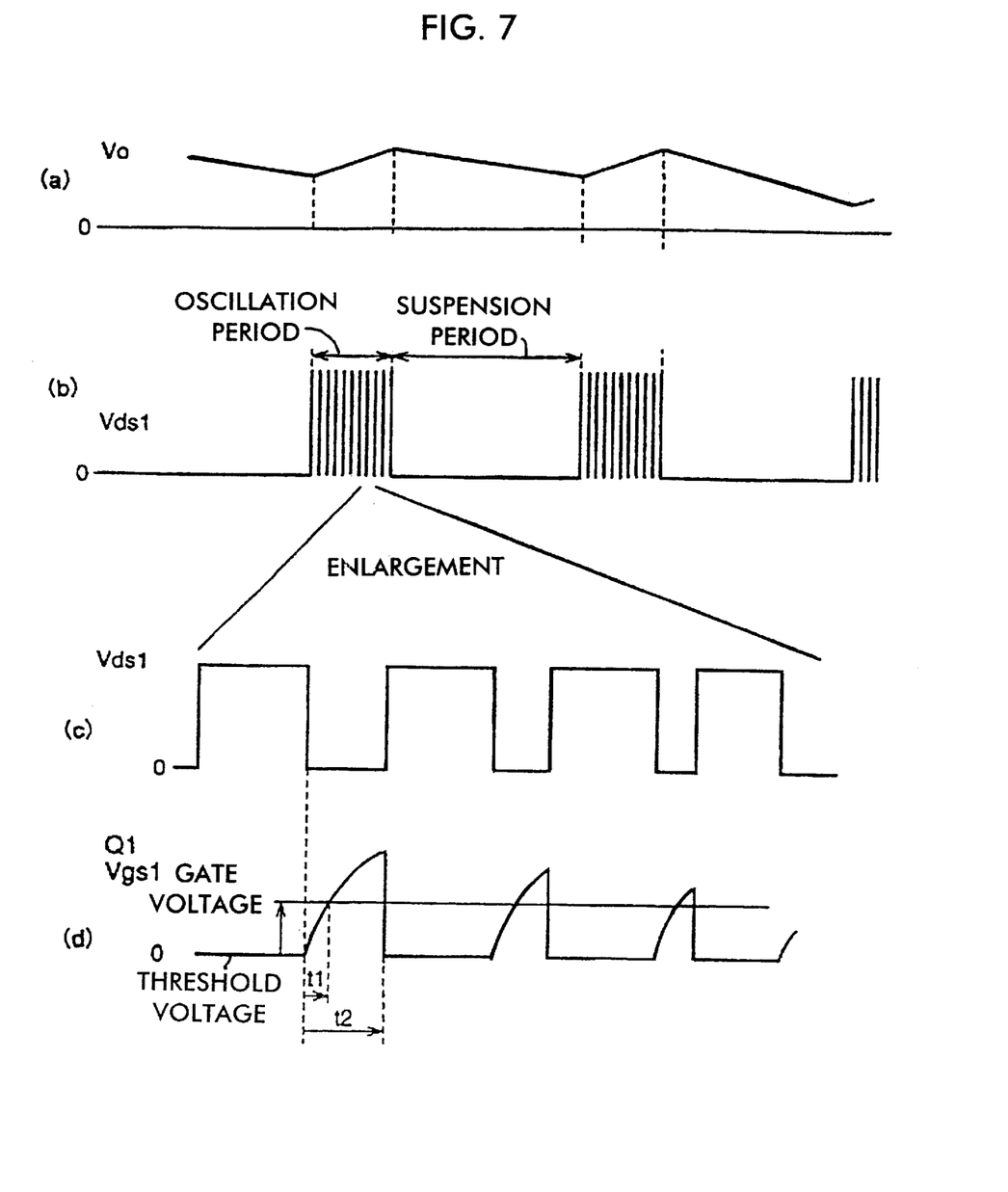

Regarding the intermittent oscillation, the output voltage increases due to charging of the output voltage during the oscillation period, and the output voltage decreases due to discharging during the suspension period. This situation is shown in FIG. 7. Waveform (a) shows an output voltage Vo, waveform (b) shows a voltage waveform between the drain and source of the MOS-FET Q1, and Waveform (c) shows an enlarged voltage waveform between the drain and source of the MOS-FET Q1, and waveform (d) shows an enlarged voltage waveform between the gate and source of the MOS-FET Q1.

As described above, since the delay of the control system allows the intermittent oscillation operation to be performed, when the switching frequency becomes higher dan a certain frequency, the intermittent oscillation operation starts. When the threshold frequency is set between a switching frequency before a decrease in the output voltage and a switching frequency after the decrease in the output voltage, the intermittent oscillation operation can be performed by the decrease in the output voltage.

Figure 8:
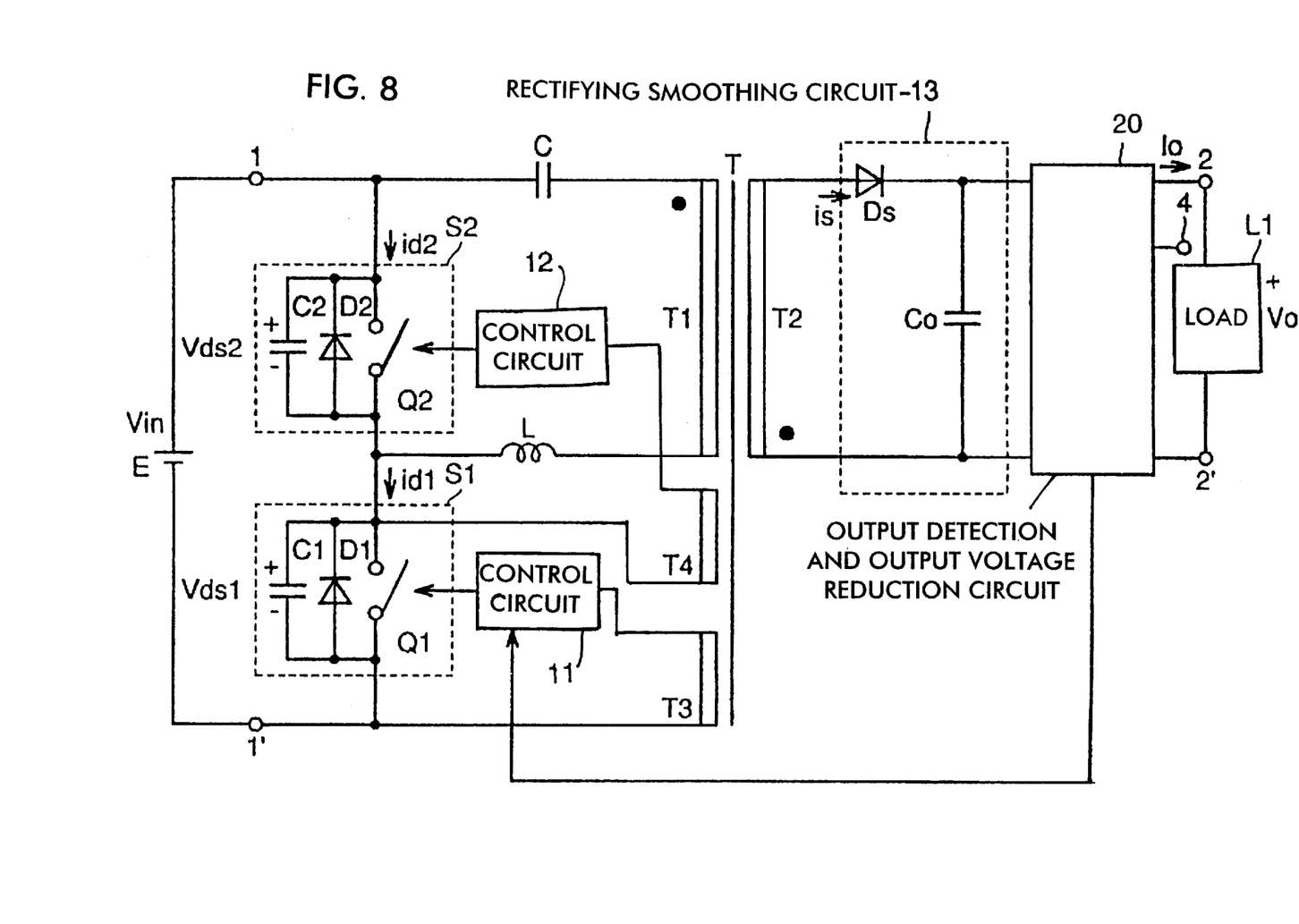
FIG. 8 shows a switching power supply unit according to another embodiment of the present invention.

FIG. 8 shows a switching power supply unit of another embodiment of the present invention. This embodiment is a modified example of the embodiment shown in FIG. 1. In this embodiment, an input power supply E, a capacitor C, a primary winding T1, an inductor L, and a switching circuit S1 are connected in series, and additionally, the input power supply E, the switching circuit S1, and a switching circuit S2 are connected in series. The operational advantages of the switching power supply unit in this embodiment are the same as those shown in FIG. 1.

It should be noted that the embodiments disclosed in this application are illustrative and not restrictive in all respects of the present invention. Accordingly, it is to be understood by those skilled in the art that the scope of the present invention is determined solely by the appended claims rather than the above-described embodiments, and all modifications that fall within the scope of the claims and the equivalence of the scope thereof are therefore intended to be embraced by the claims.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply unit comprising:
a transformer having a primary winding and a secondary winding;
a capacitor coupled to the transformer;
a first switching circuit connected in series with a series circuit of the primary winding and an input power source, the first switching circuit comprising a parallel circuit comprising a first switching element, a first diode and a first capacitor;
a second switching circuit connected in parallel with the primary winding, the second switching circuit comprising a parallel circuit comprising a second switching element, a second diode and a second capacitor;
first and second switching controlling circuits connected to the first and second switching circuits, respectively for controlling the first and second switching elements so as to turn on/off alternately with a period in which the first and second switching elements turn off being interposed therebetween;
a rectifying and smoothing circuit connected to the secondary winding; and
a voltage detection and voltage reduction circuit having a control signal input terminal and connected to the rectifying and smoothing circuit, the voltage detection and voltage reduction circuit detecting an output voltage of the rectifying and smoothing circuit and outputting a feedback signal to the first switching controlling circuit such that an output voltage of the rectifying and smoothing circuit is stabilized at one of a first voltage and a second voltage lower than the first voltage based on a signal applied to the control signal input terminal.

2. The switching power supply unit of claim 1, wherein at least one of the first and second switching elements comprises a field-effect transistor.

3. The switching power supply unit of claim 1, wherein the transformer includes a first driving winding for generating a voltage driving the first switching element into conduction and a second driving winding for generating a voltage driving the second switching element to perform a self-excited oscillation.

4. The switching power supply unit of claim 2, wherein the transformer includes a first driving winding for generating a voltage driving the first switching element into conduction and a second driving winding for generating a voltage driving the second switching element to perform a self-excited oscillation.

5. The switching power supply unit of claim 1, wherein the transformer includes one of a leakage inductor disposed between the primary winding and the secondary winding and an inductor connected in series with the primary winding; and
the inductor and the capacitor form a resonance circuit.

6. The switching power supply unit of claim 1, wherein the rectifying and smoothing circuit includes a diode, and at least one of a parasitic capacitance of the diode and a capacitive impedance connected in parallel to the diode; and
the at least one of the parasitic capacitance and the capacitive impedance and an inductance of the transformer form a resonance circuit during a period in which the first and second switching elements are both turned off.

7. The switching power supply unit of claim 2, wherein the rectifying and smoothing circuit includes a diode, and at least one of a parasitic capacitance of the diode and a capacitive impedance connected in parallel to the diode; and
the at least one of the parasitic capacitance and the capacitive impedance and an inductance of the transformer form a resonance circuit during a period in which the first and second switching elements are both turned off.

8. The switching power supply unit of claim 1, wherein the second switching controlling circuit includes a time constant control circuit comprised of a transistor, a capacitor, and an impedance circuit.

9. The switching power supply unit of claim 1, wherein an on-period of the first switching element is controlled so as to control the output voltage so that an on-period of the second switching element is maintained approximately constant.

10. The switching power supply unit of claim 2, wherein an on-period of the first switching element is controlled so as to control the output voltage so that an on-period of the second switching element is maintained approximately constant.

11. The switching power supply unit of claim 3, wherein an on-period of the first switching element is controlled so as to control the output voltage so that an on-period of the second switching element is maintained approximately constant.

12. The switching power supply unit of claim 5, wherein an on-period of the first switching element is controlled so as to control the output voltage so that an on-period of the second switching element is maintained approximately constant.

13. The switching power supply unit of claim 6, wherein an on-period of the first switching element is controlled so as to control the output voltage so that an on-period of the second switching element is maintained approximately constant.

14. The switching power supply unit of claim 8, wherein an on-period of the first switching element is controlled so as to control the output voltage so that an on-period of the second switching element is maintained approximately constant.

15. The switching power supply unit of claim 1, further comprising a control circuit for controlling the time of conduction of the second switching element such that at least one of the first and second switching elements is brought into a conductive state at a voltage of zero or after dropping down to a voltage of zero.

16. The switching power supply unit of claim 2, further comprising a control circuit for controlling the time of conduction of the second switching element such that at least one of the first and second switching elements is brought into a conductive state at a voltage of zero or after dropping down to a voltage of zero.

17. The switching power supply unit of claim 3, further comprising a control circuit for controlling the time of conduction of the second switching element such that at least one of the first and second switching elements is brought into a conductive state at a voltage of zero or after dropping down to a voltage of zero.

18. The switching power supply unit of claim 5, further comprising a control circuit for controlling the time of conduction of the second switching element such that at least one of the first and second switching elements is brought into a conductive state at a voltage of zero or after dropping down to a voltage of zero.

19. The switching power supply unit of claim 6, further comprising a control circuit for controlling the time of conduction of the second switching element such that at least one of the first and second switching elements is brought into a conductive state at a voltage of zero or after dropping down to a voltage of zero.

20. The switching power supply unit of claim 8, wherein the second switching controlling circuit controls the time of conduction of the second switching element such that at least one of the first and second switching elements is brought into a conductive state at a voltage of zero or after dropping down to a voltage of zero.

21. The switching power supply unit of claim 9, further comprising a control circuit for controlling the time of conduction of the second switching element such that at least one of the first and second switching elements is brought into a conductive state at a voltage of zero or after dropping down to a voltage of zero.

22. The switching power supply unit of claim 1, wherein the output voltage is decreased by the voltage detection and voltage reduction circuit to reduce current fed back to an input power supply; and operations of the first and second switching elements are intermittent oscillation operations in which an oscillation period for performing on/off switching operations and a suspension period for performing no switching operations are alternately repeated.

23. The switching power supply unit of claim 2, wherein the output voltage is decreased by the voltage detection and voltage reduction circuit to reduce current fed back to on input power supply; and operations of the first and second switching elements are intermittent oscillation operations in which an oscillation period for performing on/off switching operations and a suspension period for performing no switching operations are alternately repeated.

24. The switching power supply unit of claim 3, wherein the output voltage is decreased by the voltage detection and voltage reduction circuit to reduce current fed back to an input power supply; and operations of the first and second switching elements are intermittent oscillation operations in which an oscillation period for performing on/off switching operations and a suspension period for performing no switching operations are alternately repeated.

25. The switching power supply unit of claim 5, wherein the output voltage is decreased by the voltage detection and voltage reduction circuit to reduce current fed back to an input supply; and operations of the first and second switching elements are intermittent oscillation operations in which an oscillation period for performing on/off switching operations and a suspension period for performing no switching operations are alternately repeated.

26. The switching power supply unit of claim 6, wherein the output voltage is decreased by the voltage detection and voltage reduction circuit to reduce current fed back to an input power supply; and operations of the first and second switching elements are intermittent oscillation operations in which an oscillation period for performing on/off switching operations and a suspension period for performing no switching operations are alternately repeated.

27. The switching power supply unit of claim 8, wherein the output voltage is decreased by the voltage detection and voltage reduction circuit to reduce current fed back to an input power supply; and operations of the first and second switching elements are intermittent oscillation operations in which an oscillation period for performing on/off switching operations and a suspension period for performing no switching operations are alternately repeated.

28. The switching power supply unit of claim 9, wherein the output voltage is decreased by the voltage detection and voltage reduction circuit to reduce current fed back to an input power supply; and operations of the first and second switching elements are intermittent oscillation operations in which an oscillation period for performing on/off switching operations and a suspension period for performing no switching operations are alternately repeated.

29. The switching power supply unit of claims 15, wherein the output voltage is decreased by the voltage detection and voltage reduction circuit to reduce current fed back to an input power supply; and operations of the first and second switching elements are intermittent oscillation operations in which an oscillation period for performing on/off switching operations and a suspension period for performing no switching operations are alternately repeated.

30. The switching power supply unit of claim 1, further comprising an output stabilization circuit connected to the secondary winding of the transformer.

* * * * *